United States Patent
Gregerson

(10) Patent No.: US 8,684,269 B2
(45) Date of Patent: Apr. 1, 2014

(54) METHODS AND APPARATUS FOR PROVIDING A CHANGING FIELD OF VIEW IN IMAGE BASED BAR CODE SCANNING

(75) Inventor: David Lee Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 805 days.

(21) Appl. No.: 12/342,792

(22) Filed: Dec. 23, 2008

(65) Prior Publication Data

US 2010/0155484 A1     Jun. 24, 2010

(51) Int. Cl.
*G02B 26/00*     (2006.01)

(52) U.S. Cl.
USPC .................................. 235/462.38; 235/462.36

(58) Field of Classification Search
USPC .......... 235/435, 454, 462.32, 462.33, 462.36, 235/462.38, 462.39, 462.41
See application file for complete search history.

(56) References Cited

U.S. PATENT DOCUMENTS

| | | | | |
|---|---|---|---|---|
| 6,899,272 | B2 * | 5/2005 | Krichever et al. | 235/462.37 |
| 2003/0201326 | A1 * | 10/2003 | Bobba et al. | 235/462.14 |
| 2007/0084927 | A1 * | 4/2007 | Itou et al. | 235/454 |

\* cited by examiner

*Primary Examiner* — Daniel St Cyr
(74) *Attorney, Agent, or Firm* — Peter H. Priest

(57) ABSTRACT

Systems and techniques for image based bar code scanning. A rotating spinner is positioned to reflect images to an imaging device within the scanner so that a field of view of the scanner encompasses images reflected by the spinner to the imaging device. The rotation of the spinner causes the field of view of the scanner to change. Fixed mirrors positioned and oriented to reflect images to the spinner and from the spinner to the imaging device further shift the field of view of the scanner as the rotating spinner causes images reflected from different mirrors to be delivered to the imaging device.

14 Claims, 4 Drawing Sheets

METHODS AND APPARATUS FOR PROVIDING A CHANGING FIELD OF VIEW IN IMAGE BASED BAR CODE SCANNING

FIELD OF THE INVENTION

The present invention relates generally to improvements to bar code scanning. More particularly, the invention relates to improved systems and techniques for scanner optics that will cast a bar code image onto an imaging device from a range of positions within a scan volume.

BACKGROUND OF THE INVENTION

Image based scanners are becoming increasingly popular in point of sale operations, providing improved performance and durability as compared to laser scanners. Typical prior art image based scanners employ an imaging device directed at a scan window and capturing one or more images of a bar code positioned at an appropriate distance from the imaging device. Limitations of prior art image based scanners include difficulty in achieving image capture from numerous positions and orientations in which a bar code may be placed, and difficulty in achieving image capture from a bar code presented to either window of a dual window scanner without the use of two imaging devices, one for each window.

SUMMARY OF THE INVENTION

The present invention recognizes that operator convenience and efficiency is greatly enhanced by providing an operator with a wide variety of acceptable positions and orientations at which a bar code can be presented for scanning, and that it is also desirable to provide mechanisms that allow a single imaging device to be used to provide coverage of as many bar code positions and orientations as possible. To this end, a bar code scanner according to an aspect of the present invention employs a system of fixed and movable mirrors to move a reflected image of a bar code, so that the reflected image is directed to the imaging device at some point during its movement. A rotating spinner comprising multiple reflective facets may be employed so that the spinner reflects an image of the bar code and the rotation of the spinner causes the reflected image to come within the field of view of the spinner. The rotation of the spinner changes the angle at which the reflection coming from the bar code impinges on the spinner, and thus changes the angle at which it is reflected from the spinner. This change in angle results in the apparent movement of the reflected image. In addition, different facets of the spinner may suitably be differently angled so that the angle at which the image is reflected differs depending on the facet reflecting the image. Such a configuration causes shifts of the bar code image as it is reflected by different facets.

In addition to the spinner, sets of fixed mirrors may be used, which are positioned and oriented so that one or more mirrors reflects the bar code image to the spinner. In addition, one or more additional fixed mirrors may receive the image reflected from the spinner and direct that image to the imaging device. In such configurations, the movement of the spinner causes reflections to arrive at the spinner from different sets of mirrors and to leave the spinner from different sets of mirrors. Because the spinner may have multiple facets, a bar code held in one position in a scan volume may be reflected from a first sequence of fixed mirrors, to a first facet of the spinner, to a second sequence of fixed mirrors, to the imaging device, with the reflected image being translated as the spinner rotates the first facet from one edge to the opposite edge. A bar code held in a second position in the scan volume may be reflected from a third sequence of fixed mirrors, to a second facet of the spinner, to a fourth sequence of fixed mirrors, to the imaging device, with the reflected image again being translated as the spinner rotates the second facet from one edge to the opposite edge. The reflection of the bar code from different sequences of mirrors and the movement of the reflection caused by the rotation of the spinner insures that a bar code can be presented at any of numerous locations and orientations in a scan volume and present an acceptable image to the imaging device for capture.

A more complete understanding of the present invention, as well as further features and advantages of the invention, will be apparent from the following Detailed Description and the accompanying drawings.

DETAILED DESCRIPTION

Figure 1:
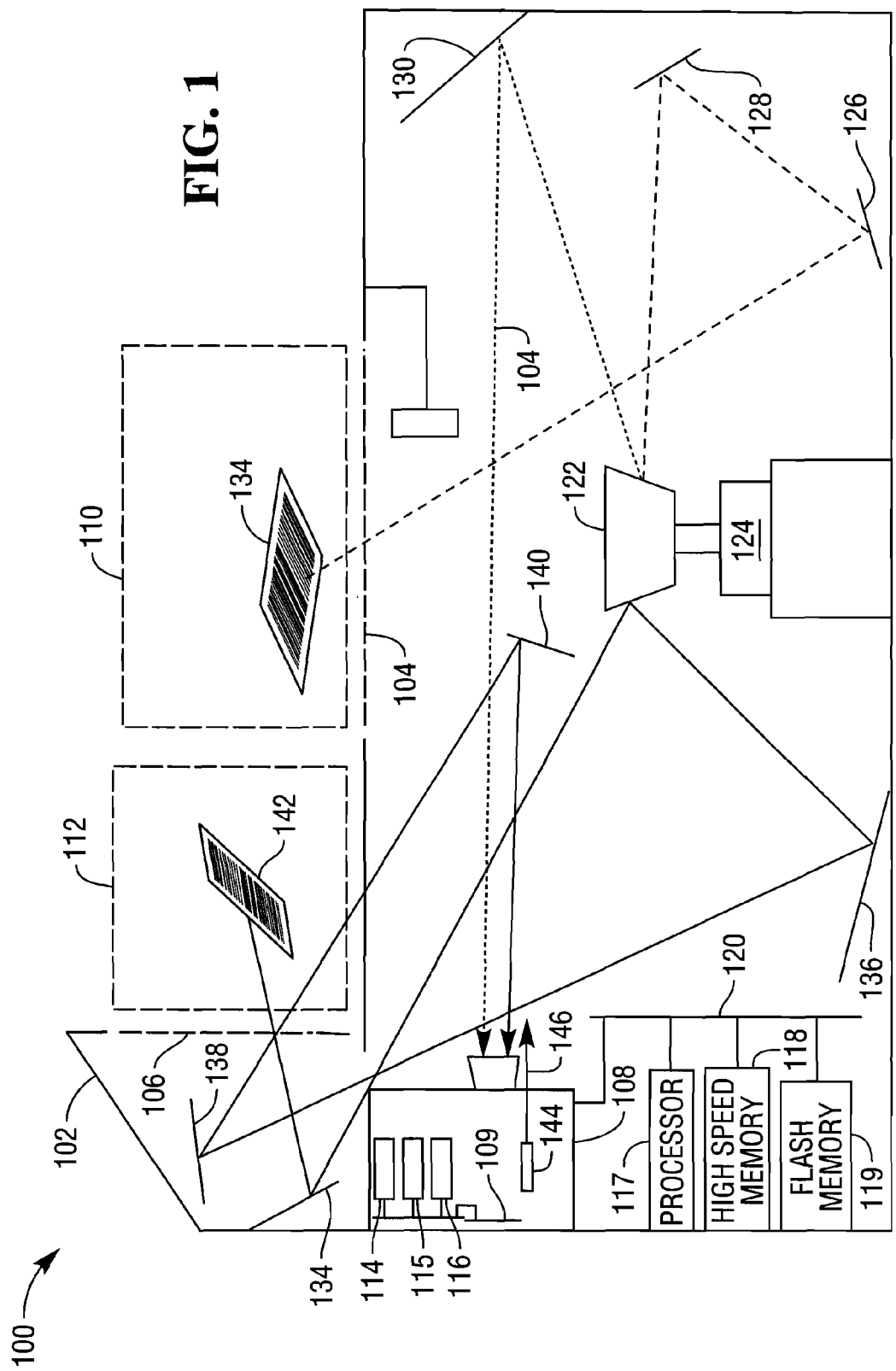
FIG. 1 illustrates a bar code scanner according to an aspect of the present invention.

FIG. 1 illustrates a scanner 100 according to an aspect of the present invention. The scanner 100 includes a housing 102, horizontal and vertical scan windows 104 and 106, and an imaging device 108. The imaging device 108 uses an imaging element 109 to capture digital images of objects placed within either of the scan volumes 110 and 112. These images may be processed by data processing elements in the imaging device 108, such as a processor 114, memory 115, and storage 116, scanner 100, including a processor 117, memory 118, and long term storage such as flash memory 119, communicating with one another and with the imaging device 108 over a bus 120. Images may be captured and processed to extract bar code information according to techniques known in the art.

In order to provide for increased operator convenience and efficiency, as well as flexibility and economy in scanner design, the scanner 100 further includes optical elements to direct images of bar codes to the scanner along desired pathways, with these pathways being changed in predetermined ways. Such use of optical elements allows for an increase in the size of the scan volumes 110 and 112 in which positioning of a bar code for an effective scan can be performed. This use of optical elements also allows for economy in the use of imaging devices, because one imaging device 108 can be used to capture images of bar codes presented at either of the scan windows 104 or 106, and also allows for flexibility in scanner design. Rather than placing an imaging device such as the imaging device 108 to have a direct view of a scan window such as the scan window 104, an imaging device can be placed at any location to which it is suitable to direct an image through the placement of optical elements. The optical elements include a rotating spinner 122, rotated by a motor 124. The scanner 100 further includes a sequence of fixed mirrors 126, 128, and 130. In the present example, the fixed mirror 126 receives a reflection from a bar code 132 positioned in the scan volume 110, and directs the reflection to the fixed mirror 128 and then to the spinner 122. The spinner in turn directs the reflection to the mirror 130 which directs the reflection to the imaging device 108. The spinner 122 suitably has four differently angled facets, so that the facets reflect incident light at different angles. As the spinner 122 rotates, the position of each facet changes, so that the field of view encompassed by the facet changes. In addition, the angle of incidence of light striking the spinner 122 changes, so that light originating from the same point strikes and leaves the facet at a constantly changing angle. The effect of the rotation of the spinner 122 is therefore to capture and reflect light, and therefore images of objects from which the light is reflected, from different origins, and to present images which translate through space with the rotation of the spinner. An image of the bar code 132 will therefore come into the field of view of the spinner 122 and will move along a pathway that takes it into the field of view of the imaging device 108, and this will occur for numerous positions and orientations of the bar code 132 in the scan volume 110.

Similarly, the scanner 100 includes a sequence of mirrors 134, 136, 138, 140 providing one pathway for reflection of an image entering the scan window 106. An image of the bar code 142 enters the scan window 106, and is directed from the mirror 134, to the spinner 122, to the mirrors 136, 138, and 140, and to the imaging device 108. The reflected image of the bar code 142 is translated by the rotation of the spinner 122 so that it is directed to the imaging device 108 at some point during the rotation of the spinner 122.

The movement of the field of view, and shifts between different fields of view, may be relatively rapid, so as to quickly encompass many different locations in the scan zones 110 and 112. Therefore, the bar code 132 or the bar code 142, if held in approximately one position, may be in the field of view of the scanner for only a relatively short time during each rotation of the spinner 122. For this reason, the processing elements of the scanner 100, such as the imaging element 109, processor 114, memory 115, and storage 116, and the processor 117, memory 118, and storage 119, are suitably chosen so as to operate at a high speed to allow for rapid image capture and processing and, if desired, to allow for numerous rapid captures of an image as the spinner 122 rotates repeatedly through the same rotational position.

The imaging device 108 may suitably include an illuminator 144, which illuminate the scan volumes 110 and 112. The illuminator 144 may emit infrared or visible light, and is suitably positioned and oriented to provide on-axis illumination. On-axis illumination is less irritating to an operator but can be expected to introduce reflection and noise. The imaging device 108 therefore suitably includes appropriate optical or digital filtering and compensation, and the data processing elements of the scanner 100 are suitably programmed so as to reduce or eliminate noise and other effects introduced by such illumination that tend to degrade imaging accuracy and the efficiency of decoding. The illuminator 144 directs an illumination beam 146 out of the imaging device 108 in the opposite direction from incoming light rays. The path of the illumination beam 146 is directed by the spinner 122 and the fixed mirrors so that it illuminates the field of view of the scanner 100 at any particular time. For example, when the spinner 122 is positioned so that an image of the bar code 142 is directed to the imaging device 108, the positioning of the spinner also serves to direct the illumination beam to illuminate the bar code 142.

Figure 2:
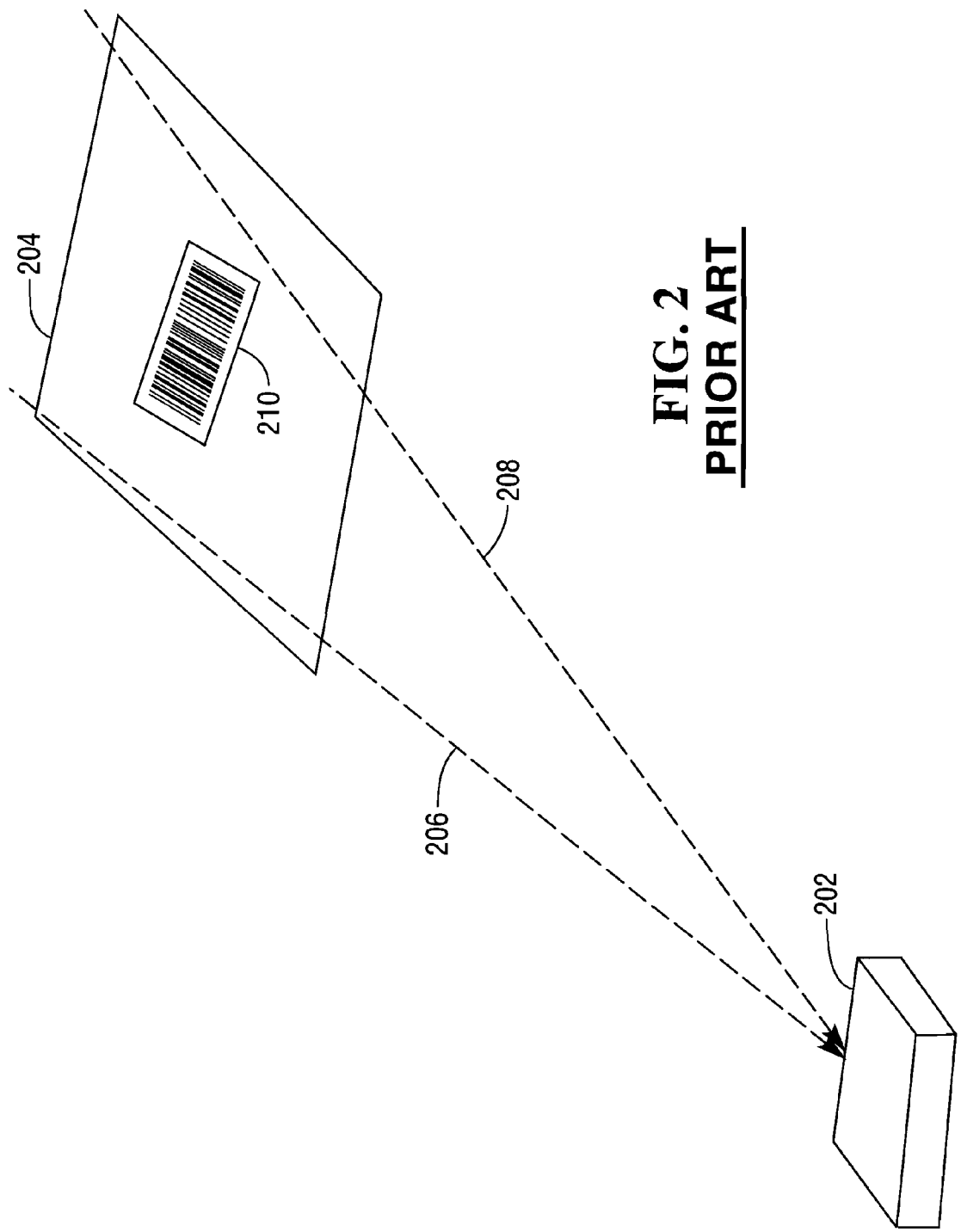
FIG. 2 illustrates additional aspects of selected optical elements of a scanner according to an aspect of the present invention.
Figure 3:
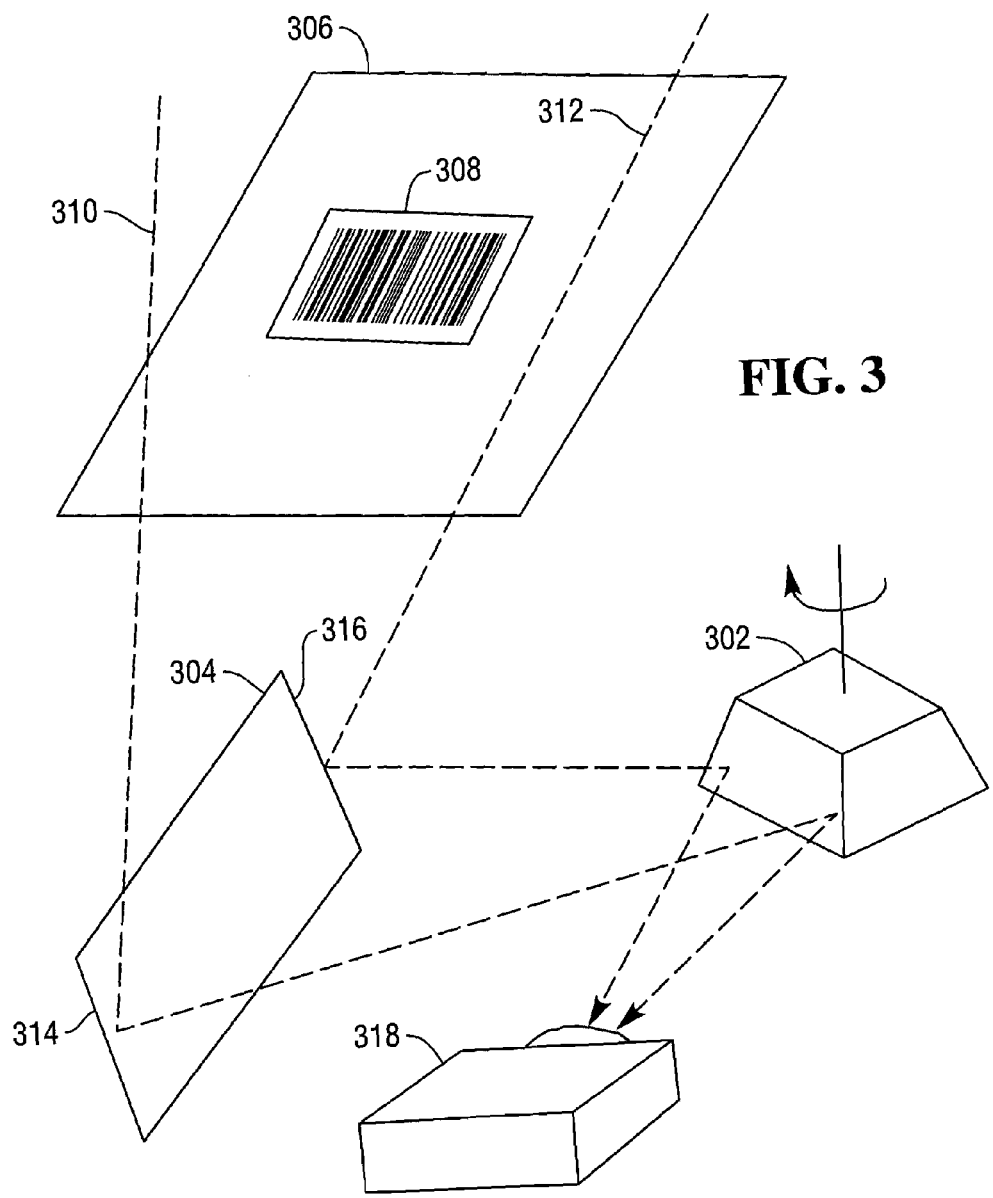
FIG. 3 illustrates a process of image based bar code scanning according to an aspect of the present invention.

FIGS. 2 and 3 illustrate selected details of optical components and arrangement of a prior art scanner configuration and of a configuration according to an aspect of the present invention. FIG. 2 illustrates a prior art configuration of an imaging device 202 with a direct view of a scanner window 204. The imaging device 202 has a fixed field of view with boundaries 206 and 208. A bar code, such as the bar code 210 must be presented at a distance within the effective focal range of the imaging device 202, and this distance is simply the direct distance between the bar code 210 and the imaging device 202.

FIG. 3 illustrates details of selected optical elements similar to those that may be used in a scanner such as the scanner 100 of FIG. 1. For simplicity, a scanner housing is not shown and only a limited number of optical elements are used. The function of the optical elements shown is to present a varying field of view to an imaging device. The optical components include a rotating spinner 302, a fixed mirror 304, and a scanner window 306. A bar code 308 is shown as being placed over the scanner window 306. The optical components shown provide an effective field of view bounded by the light paths 310 and 312. The edges 314 and 316 of the mirror 304 bound the field of view provided by the particular configuration shown here, with the field of view encompassing light reaching the mirror at and between the edges 314 and 316. This light travels to the rotating spinner 302, which directs it to the imaging device 318. The rotation of the spinner 302 causes the effective field of view of the scanner, and in an actual application in which multiple mirrors and combinations of mirrors are used, the different pathways taken from the scanner window 306 to the imaging device 302 provide multiple alternating fields of view. In addition, the diversions caused by reflection of light from the mirror 304 and the spinner 302 provide an optical path between the bar code 308 and the imaging device 318 having an increased length as compared to the actual physical distance between the imaging device 318 and the bar code 308. Such an arrangement provides increased flexibility in placement of the imaging device 318 with respect to the scanner window 304.

Figure 4:
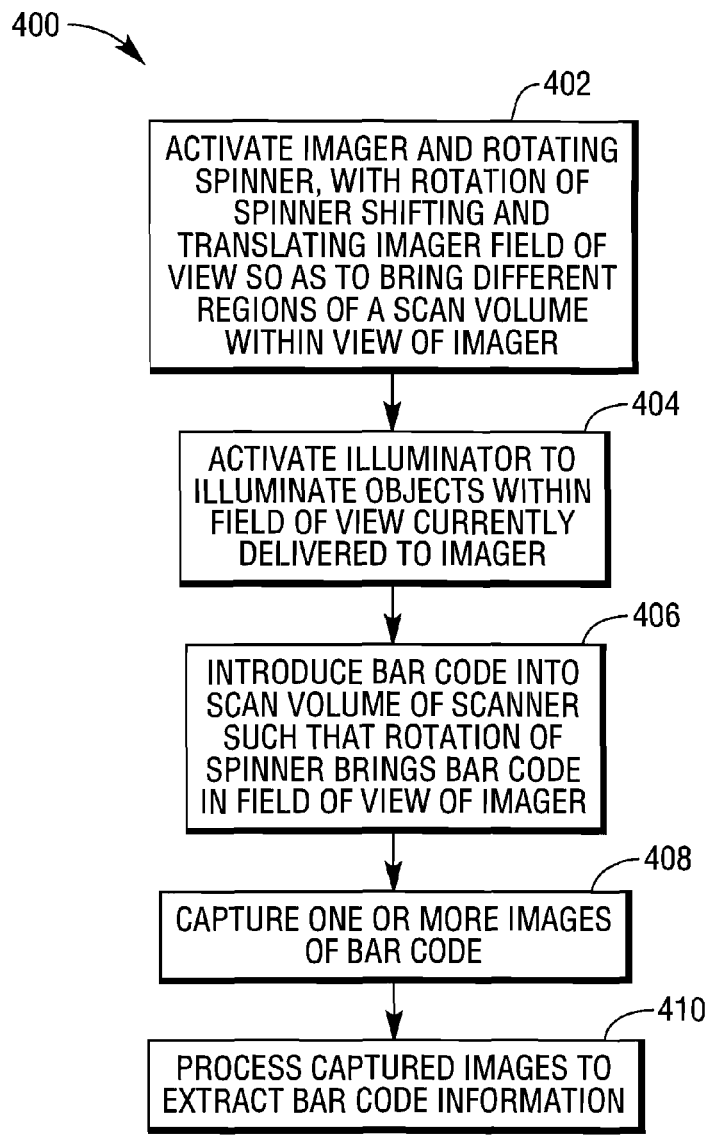
FIG. 4 illustrates the steps of a process of image based bar code scanning according to an aspect of the present invention.

FIG. 4 illustrates the steps of a process 400 of image based bar code scanning according to an aspect of the present invention. The process 400 may suitably be carried out using a scanner such as the scanner 400 of FIG. 1. At step 402, an imaging device and a rotating spinner are activated, with the rotating spinner being operative to create a variable field of view for the imaging device. An image of an object effectively moves with the rotation of the spinner, and the movement of the spinner also changes the perspective of the imaging device because reflections travel from the scan volume to the spinner and from the spinner to the imaging device along different sets of stationary mirrors which are placed and oriented so as to provide fields of view encompassing different regions of the scan volume.

At optional step 404, an illuminator is activated. The illuminator suitably directs light along the same paths as incoming light, so as to illuminate an object that is within the field of view of the imaging device at any particular time. At step 406, a bar code is introduced into a scan zone of the scanner, such that the rotation of the spinner will cause the field of view of the imaging device to shift and move so as to bring an image of the bar code into the field of view of the imaging device. At step 408, as images of the bar code are brought within the field of view of the imaging device, one or more of those imaging devices are captured. At step 410, the captured images are processed to extract bar code information.

While the present invention is disclosed in the context of a presently preferred embodiment, it will be recognized that a wide variety of implementations may be employed by persons of ordinary skill in the art consistent with the above discussion and the claims which follow below.

I claim:

1. An image based fixed bar code scanner comprising:
   an imaging device for capturing a plurality of images of a moving bar code;
   a rotating multifaceted mirrored spinner for reflecting the images of the bar code, with the rotating spinner being positioned and oriented such that a field of view of the scanner encompasses the images of a bar code reflected by the spinner to the imaging device and such that the rotation of the mirror acts to provide the imaging device with a changing field of view; and
   a plurality of sets of fixed mirrors positioned around the mirrored spinner and oriented to receive the images from different directions so that the sets of fixed mirrors reflect the images from the bar code to the spinner and from the spinner to the imaging device.

2. The image based fixed bar code scanner of claim 1, wherein the sets of fixed mirrors and the rotating spinner are positioned and oriented such that rotation of the spinner causes the field of view of the scanner to shift between reflections from different sets of fixed mirrors.

3. The image based fixed bar code scanner of claim 2, wherein the sets of fixed mirrors and the rotating spinner are positioned and oriented such that the rotation of the spinner causes the field of view of the scanner to shift between a vertical scan window and a horizontal scan window.

4. The image based fixed bar code scanner of claim 1, further comprising an illuminator directing an illumination beam such that the beam is reflected from the spinner to illuminate the field of view of the scanner.

5. The image based fixed bar code scanner of claim 4 wherein the illuminator provides on-axis illumination.

6. The image based fixed bar code scanner of claim 5 further comprising:
   digital filtering and compensation, and data processing elements to compensate for noise introduced by the on-axis illumination.

7. The image based fixed bar code scanner of claim 1 further comprising a first scan window and a second scan window, and wherein said plurality of sets of fixed mirrors comprises a first set of fixed mirrors including at least one mirror oriented to receive images from the first scan window and a second set of fixed mirrors including at least one mirror oriented to receive images from the second scan window.

8. The image based fixed bar code scanner of claim 7 wherein an optical path from a bar code to the imaging device is substantially longer than an actual physical distance between the imaging device and the bar code.

9. The image based fixed bar code scanner of claim 1 wherein a first set of said plurality of sets of fixed mirrors comprises a sequence of at least three fixed mirrors.

10. The image based fixed bar code scanner of claim 9 wherein a second set of said plurality of sets of fixed minors comprises a sequence of at least three fixed mirrors.

11. A method of image based fixed bar code scanning comprising the steps of:
    reflecting a plurality of images of a moving bar code from different directions towards a mirrored spinner and from the mirrored spinner to an image device by a plurality of sets of fixed mirrors positioned around the mirror spinner;
    rotating the mirrored spinner so that a field of view of the scanner encompasses the images of the bar code reflected from the sets of fixed mirrors to the spinner and from the spinner to an imaging device; and
    capturing the images of the bar code by the image device.

12. The method of claim 11, wherein the field of view of the scanner shifts with the rotation of the spinner between images reflected from different sets of fixed mirrors.

13. The method of claim 12, wherein the field of view of the scanner shifts with the rotation of the spinner between a horizontal scan window and a vertical scan window.

14. The method of claim 11, further comprising directing an illumination beam such that the beam is reflected from the rotating spinner so as to illuminate a field of view of the scanner.

* * * * *